United States Patent
Rapoza et al.

(10) Patent No.: US 6,580,962 B2
(45) Date of Patent: Jun. 17, 2003

(54) METHOD FOR ALIGNING A SPATIAL ARRAY OF PATTERN PIECES COMPRISING A MARKER METHOD

(75) Inventors: Thomas Rapoza, Manchester, CT (US); Andrew Zink, Stafford Springs, CT (US); Jeffrey Monroe, Bolton, CT (US)

(73) Assignee: Gerber Technology, Inc., Tolland, CT (US)

( * ) Notice: Subject to any disclaimer, the term of this patent is extended or adjusted under 35 U.S.C. 154(b) by 40 days.

(21) Appl. No.: 09/928,280

(22) Filed: Aug. 10, 2001

(65) Prior Publication Data

US 2003/0033047 A1 Feb. 13, 2003

(51) Int. Cl.[7] .............................. G01F 19/00; G06K 9/32
(52) U.S. Cl. ........................ 700/135; 382/111; 382/295
(58) Field of Search ................................ 700/135, 131, 700/134, 143; 382/111, 170, 294, 295; 83/76.1, 76.6, 76.7, 76.8

(56) References Cited

U.S. PATENT DOCUMENTS

| | | | |
|---|---|---|---|
| 4,961,149 A | | 10/1990 | Schneider et al. |
| 5,172,326 A | | 12/1992 | Campell, Jr. et al. |
| 5,333,111 A | * | 7/1994 | Chaiken et al. ............. 700/135 |
| 5,353,355 A | | 10/1994 | Takagi et al. |
| 5,487,011 A | | 1/1996 | Chaiken |
| 5,508,936 A | | 4/1996 | King et al. |
| 6,192,777 B1 | * | 2/2001 | Williams et al. ......... 83/76.6 X |

* cited by examiner

Primary Examiner—Peter Nerbun
(74) Attorney, Agent, or Firm—McCormick, Paulding & Huber LLP

(57) ABSTRACT

In a method for aligning a spatial array of pattern pieces comprising a marker, a work material processing apparatus defining a support surface adapted to carry work material is provided and at least one layer of work is spread thereon. Images of said work material at a reference point and match point are captured and superimposed over one another these superimposed images being projected onto a display. One of said images of said work material at said reference point in said image of said work material at said match point is moved relative to the other to substantially align the images. The position of a matching pattern piece contained within the marker is then moved in accordance with the amount of relative movement to align the pattern of the sheet material within a boundary defined by the matching pattern piece with that defined by the reference pattern piece.

6 Claims, 1 Drawing Sheet

METHOD FOR ALIGNING A SPATIAL ARRAY OF PATTERN PIECES COMPRISING A MARKER METHOD

CROSS REFERENCE TO RELATED APPLICATIONS

The present application is related to copending application Ser. No. 09/928,145 filed on even date herewith and entitled "Method For Compensating for Pattern Distortion on Sheet-Type Work Material", to Andrew Zink, and assigned to Gerber Technology of Tolland, Conn., the disclosure of which is incorporated herein by reference. The present invention is also related to U.S. Pat. No. 5,333,111 to Chaiken et al. issued on Jul. 26, 1994, and also assigned to Gerber Technology, the disclosure of which is incorporated herein by reference.

FIELD OF THE PRESENT INVENTION

The present invention generally relates to positioning pattern pieces on sheet-type work material, and is more specifically directed to aligning said pattern pieces relative to one another and with a pattern defined by the work material.

BACKGROUND OF THE PRESENT INVENTION

During the processing of sheet-type work material, such as fabric, one or more layers of fabric are typically spread onto what is referred to by those skilled in the art of fabric processing as a spreading table. The fabric is then moved, often via a conveyor, onto a support surface forming part of a fabric processing apparatus like a cloth cutting machine.

During the spreading and subsequent movement of the fabric some stretching and misalignment often occurs. This is especially problematic when the fabric contains a pattern as any pattern pieces cut from the stretched and misaligned fabric will likewise have the pattern misaligned therein.

Generally, pattern pieces are positioned on the spread fabric in a spatial array of garment segments positioned in a cutting sequence. This spatial array of garment segments is referred to by those skilled in the pertinent art to which the present invention pertains as a "marker." Usually markers are computer generated to optimize piece pattern density and thereby minimize the waste of fabric or other spread material. In the past, computerized marker systems simply generated a marker having fairly large tolerances between adjacent pieces. The spread was first cut such that the pieces to be matched were cut including the aforementioned tolerances. These pieces were then provided to a skilled worker who would manually align the several patterns with the geometric spread design and thereafter re-cut the matched pieces. Spreads that had a geometric pattern such as plaids or stripes also caused difficulty because the clothing designer could specify an alignment of the pattern in several adjacent pieces. As a result, pieces cut from a spread having a geometric design invariably mandate higher costs due to increased waste and the use of slow, skilled labor in the cutting process.

Often, patterns need only be matched in one direction, e.g. in the warp or weft direction. An example of this is a pattern for a man's suit, where the weft would be expected to match all the way around the garment, while at the same time, the actual weft pattern is not required to be in any particular location with respect to the pattern pieces. Accordingly, this type of matching is a relative match, and not a match to the overall fabric condition. A problem that sometimes occurs when matching pattern pieces of this type is that an operator, due to distortion of the spread work material, as well as the potential complexity of the pattern, may have difficulty visually aligning the match image to the reference image.

Based on the foregoing, it is the general object of the present invention to provide a method for matching pattern pieces, that comprise a marker, on sheet-type work material spread onto a support surface that overcomes the problems and drawbacks of prior art methods.

SUMMARY OF THE PRESENT INVENTION

The present invention is directed in one aspect to a method for aligning a spatial array of pattern pieces comprising a marker onto at least one layer of sheet-type work material wherein the work material defines a pattern thereon. A work material processing apparatus is provided that defines a support surface adapted to carry at least one layer of sheet-type work material thereon. The work material is spread onto the support surface, resulting in some distortion and deviation of the work material.

Means for selectively capturing images of areal portions of said work material are employed to provide images of portions of said work material in response to commands issued from a controller in communication therewith. A display is also in communication with the controller for projecting images received by the controller in response to commands issued therefrom. The controller receives marker signals corresponding to an array of pattern pieces that include a reference signal corresponding to a reference point on a reference pattern piece. The controller is programmed to analyze the marker to be registered with the work material and the pattern defined thereon, as well as the images received from the means for selectively capturing images.

In performing the above-referenced method, the means for selectively capturing images is operated to capture an image of the work material in the area surrounding and including the reference point. In addition, the means for selectively capturing images is further operated to capture an image of the work material in an area surrounding and including a match point corresponding to a point on the marker where a matching pattern piece is initially positioned. The images of the work material at the reference point, and the work material at the matching point are superimposed, one over the other on the display.

Next, one of the images of the work material at the reference point, and the work material at the matching point is moved relative to the other until the patterns on each image match. Subsequently, the position of the matching pattern piece within the marker is then adjusted relative to the matching point, so that the pattern within a boundary defined by the matching pattern piece is alignable with that defined by the reference pattern piece.

DETAILED DESCRIPTION OF THE PREFERRED EMBODIMENTS OF THE PRESENT INVENTION

Figure 1:
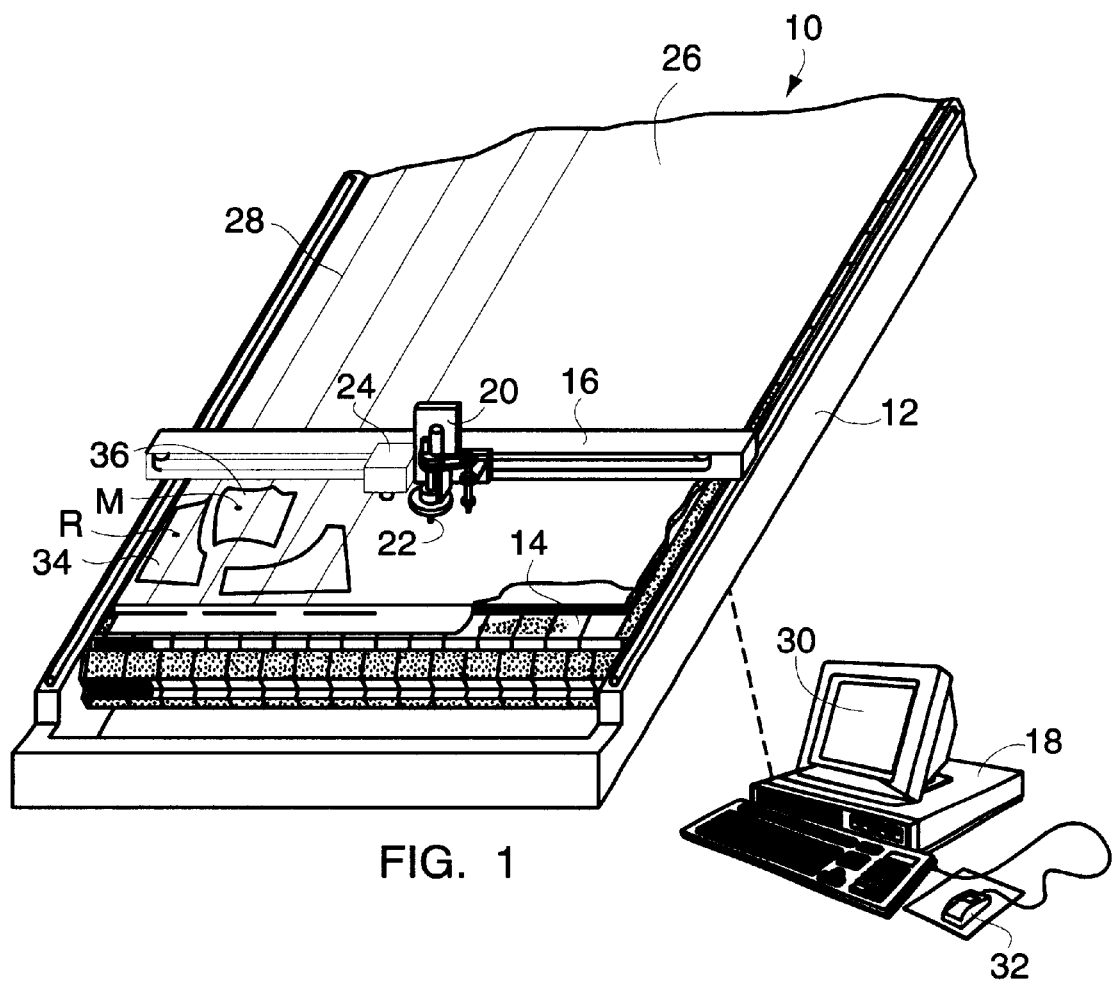
FIG. 1 is a perspective view of a flat bed type cloth cutting apparatus having a layer of sheet-type work material defining a pattern thereon positioned on the cutting table.

As shown in FIG. 1 a sheet-type work material processing apparatus generally designated by the reference number 10 and depicted in the illustrated embodiment as a cloth cutting machine defines a frame 12 having a support surface 14 carried thereon. The cutting machine 10 also includes a beam 16 extending transversely across the support surface and moveable back and forth in a longitudinal direction thereof in response to command signals generated and issued by a controller 18 in communication with a cutting apparatus. A cutting head 20 having a cutting tool 22 such as a reciprocating blade mounted thereon is mounted onto the beam 16 for movement longitudinally thereof also in response to command signals generated and issued by the controller 18. A camera 24 is attached to the cutting head 20 and moves with it for capturing images of a layer of sheet-type work material 26 defining a pattern 28 thereon.

A display 30 shown in the illustrated embodiment as a computer type monitor is in communication with the controller as is the camera 24. While the controller 18 has been shown in the illustrated embodiment as a PC type computer, the present invention is not limited in this regard as any type of controller capable of being programmed to receive signals from a camera, or sensors in general, and to send the image received to a display such as a programmable logic controller can be substituted without departing from the broader aspects of the present invention. In addition, while a computer type monitor has been shown and described in the illustrated embodiment the present invention is also not limited in this regard as any type of display device capable of displaying an image of areal portions of the spread work material such as a screen housed in a control panel can be substituted without departing from the broader aspects of the present invention.

The controller 18 is programmed to operate the beam 16 and the cutter head 20 to move them across the surface of the work material 26 carried by the support surface 14 so as to carry out both image capturing and cutting operations. In addition, the controller is programmed for receiving marker signals corresponding to an array of pattern pieces. These marker signals further including a reference signal corresponding to a reference point on a reference pattern piece. The controller is provided with further information corresponding to the marker to be registered with the work material positioned on the support surface 14 and the pattern defined thereon, as well as for analyzing images received from the camera.

Figure 2:
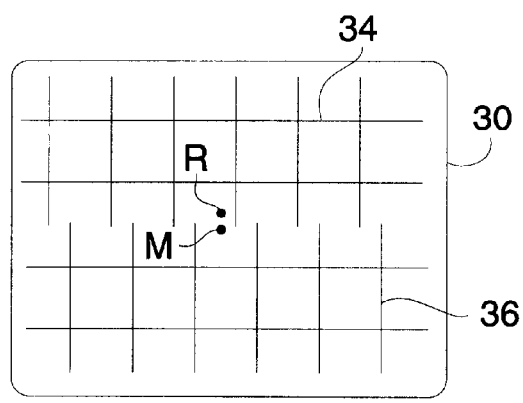
FIG. 2 is a schematic representation of images of the work material at a reference point and the work material at a matching point shown in a nonaligned condition.
Figure 3:
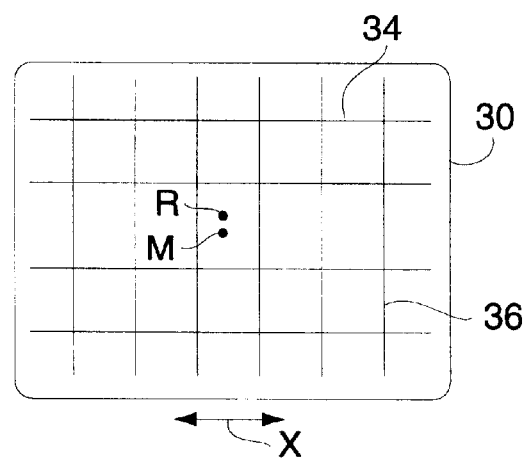
FIG. 3 is a schematic representation of the images of FIG. 2 shown in an aligned condition.

Referring to FIGS. 2 and 3 during an alignment operation, the beam 16 and the cutter head 20 are caused to move in response to commands issued from the controller 18. Since the camera 24 is coupled to the cutter head 20, it too moves with the beam 16 and the cutter head. The camera 24 is moved to a position over the work material 26 corresponding to a reference point labeled in the illustrated embodiment as "R" and corresponding to a point within a reference pattern piece 34, and an image of the work material 26 in this area is captured by the camera. The camera 24 generates signals corresponding to the captured image of the work material 26 and transmits them to the controller 18. The camera 24 is next moved to a position over a matching point labeled in the illustrated embodiment as "M" and corresponding to a point within a matching pattern piece 36. The relationship between the reference and matching pattern pieces, 34 and 36 respectively, is such that in the finished garment corresponding to these pattern pieces, there must be a pattern match in the warp or weft direction between all or at least a portion of the reference and matching pattern pieces.

Turning to FIG. 2, the images of the work material 26 in the areas of reference and match points, "R" and "M" respectively, are projected, via signals generated by the controller 18 onto the display 30, and superimposed one over the other. In the illustrated embodiment the image of the work material in the area of the match point is superimposed over the image of the work material in the area of the reference point, however, the present invention is not limited in this regard. Moreover, the whole image of the work material in one of the areas of the reference and match points does not have to be superimposed imposed over the whole image of the other. One or both images can be split into at least two match images or at least two reference images, and one of the match images or reference can be superimposed over the complete image of the other. Furthermore, the image of the work material around the reference point and that around the match point can each be split into at least two smaller images with one image from each being positioned adjacent one another on the display 30.

As shown in FIG. 3, and since the images of the work material in the ares of the reference and matching points, 34 and 36 respectively, must be substantially aligned, an operator, via a pointing device, such as, but not limited to a mouse (not shown) in communication with the controller 18, moves the matching pattern in one direction only as indicated in the illustrated embodiment by the arrows labeled "X", to align the patterns defined by the images of the work material, 34 and 36. The controller 18 analyzes the movement of the portion of the images of the work material in the area of the reference and matching points 34, and 36 respectively relative to one another and determine the amount in which the pattern piece in the marker must be moved to obtain proper alignment of the pattern defined by the work material with respect to the pattern piece in the marker encompassing the reference point. While manual alignment has been described, the present invention is not limited in this regard as the controller can also be operated to perform an automatic alignment without departing from the broader aspects of the present invention.

This process is repeated with any remaining pattern pieces in the marker that require pattern alignment with other pattern pieces. Accordingly, a pattern piece that was a matching pattern piece in one instance may become a reference pattern piece relative to other pattern pieces in another instance.

While preferred embodiments have been shown and described various modifications and substitutions may be made without departing from the spirit and scope of the invention. Accordingly, it is to be understood that the present invention has been described by way of example and not by limitation.

What is claimed is:

1. A method for aligning a spatial array of pattern pieces comprising a marker, said method including the steps of:
   providing at least one layer of sheet type work material defining a repeating pattern thereon;
   providing a work material processing apparatus defining a support surface adapted to carry said work material thereon;
   spreading said work material onto said support surface;
   providing means for selectively capturing images of areal portions of said work material;
   providing a display for projecting images captured by said means for selectively capturing images, thereon;
   providing a controller for receiving marker signals corresponding to said array of pattern pieces, said marker signals further including a reference signal corresponding to a reference point on a reference pattern piece and a match signal corresponding to a match point on a match pattern piece, where the match pattern piece may only be adjusted along a single direction, said marker to be registered with said work material and said patterns defined thereon, and for analyzing images received from said means for selectively capturing images;

operating said means for selectively capturing images to capture an image of said work material at said reference point;

operating said means for selectively capturing images to capture an image of said work material at a match point corresponding to a point on said marker where a matching pattern piece is initially positioned;

superimposing one of said images of said work material at said reference point and said work material at said match point over the other onto said display;

moving one of said images of said work material at said reference point and said image of said work material at said match poin relative to the other to substantially align them; and adjusting the position of said matching pattern piece within said marker, to align said pattern of said sheet material within a boundary defined by said matching pattern piece with that defined by said reference pattern piece.

2. A method for aligning a spatial array of pattern pieces comprising a marker as defined by claim 1 wherein said means for selectively capturing images includes a camera.

3. A method for aligning a spatial array of pattern pieces comprising a marker as defined by claim 1, wherein said processing apparatus is a cloth cutting machine.

4. A method for aligning a spatial array of pattern pieces comprising a marker as defined by claim 1, wherein said cloth cutting machine includes:

a frame;

said support surface being carried by said frame;

a beam coupled to said frame for movement back-and-forth, in response to commands issued from said controller, in a direction longitudinal of said support surface, over said work material spread thereon;

a cutting head having a cutting tool installed therein, said cutting head being coupled to said beam and movable therealong in response to commands issued from said controller; and wherein said camera is mounted on said beam.

5. A method for aligning a spatial array of pattern pieces composing a marker as defined by claim 1, whenein;

said step of superimposing one of said images further includes splitting a respective one of said images of said work material at said reference point and said work material at said match point into at least two match images and superimposing one of said match images over the image of said work material at said match point, and said work material at said reference point that was not split.

6. A method for aligning a spatial array of pattern pieces comprising a marker as defined by claim 1, wherein;

said step of superimposing one of said images includes;

splitting said image of said work material at said reference point into at least two reference images;

splitting said image of said work material at said match point into at least two match images; and positioning one of said match images adjacent to one of said reference images; and wherein said step of moving one of said images includes moving one of said match and reference images relative to the other.

* * * * *